United States Patent [19]

Heider

[11] 4,339,551

[45] Jul. 13, 1982

[54] THERMOPLASTIC RESIN FOAM SHEET HAVING IMPROVED HEAT SHRINK CAPABILITY AND THE METHOD FOR ITS PRODUCTION

[75] Inventor: James E. Heider, Toledo, Ohio

[73] Assignee: Owens-Illinois, Inc., Toledo, Ohio

[21] Appl. No.: 139,086

[22] Filed: Apr. 10, 1980

[51] Int. Cl.$^3$ .............................................. B29D 27/00
[52] U.S. Cl. ...................................... 521/138; 264/25; 264/51; 264/230; 264/321; 264/DIG. 71; 521/139; 525/170; 525/240
[58] Field of Search ......... 264/51, 230, 321, DIG. 71, 264/25; 521/138, 139, 81, 915; 525/170, 240

[56] References Cited

U.S. PATENT DOCUMENTS

| | | | |
|---|---|---|---|
| T941,021 | 12/1975 | Mathews et al. | 521/138 X |
| 3,014,887 | 12/1961 | Haward | 525/240 X |
| 3,065,190 | 11/1962 | Chisholm et al. | 525/240 X |
| 3,274,328 | 9/1966 | Davis | 525/240 X |
| 3,299,181 | 1/1967 | Coover et al. | 525/240 X |
| 3,364,284 | 1/1968 | Edmonds et al. | 525/240 X |
| 3,417,177 | 12/1968 | Simons et al. | 264/230 |
| 3,448,573 | 6/1969 | Glen et al. | 264/230 X |
| 3,554,932 | 1/1971 | Overcashier | 521/138 X |
| 3,645,930 | 2/1972 | Normanton | 525/240 X |
| 3,657,163 | 4/1972 | Kishikawa et al. | 521/139 X |
| 3,666,834 | 5/1972 | Bullard | 525/240 |
| 3,734,237 | 5/1973 | Watanabe | 264/230 X |
| 3,847,721 | 11/1974 | Evans | 264/230 X |
| 3,903,203 | 9/1975 | Trieschmann et al. | 525/240 X |
| 3,967,991 | 7/1976 | Shimano et al. | 264/230 X |
| 4,007,246 | 2/1977 | Bailey | 264/230 X |
| 4,014,724 | 3/1977 | Rausing | 264/230 X |
| 4,034,131 | 7/1977 | Rhoads | 264/230 X |
| 4,039,362 | 8/1977 | Ernstsson et al. | 264/230 X |
| 4,172,873 | 10/1979 | Spicer | 264/230 |

*Primary Examiner*—Philip Anderson
*Attorney, Agent, or Firm*—E. J. Holler; M. E. Click; D. H. Wilson

[57] ABSTRACT

This invention relates to a thermoplastic, foam composition having enhanced heat-shrink capability by the physical intermixing therein of a minor amount of a second polymeric material having superior infrared absorbing properties. The intermixed composition is able to be foamed and formed into an oriented sheet adapted to fabricating heat-shrink tubular labels or sleeves, for example, having improved thermal contraction properties when subjected to infrared radiation. The subject composition is thus able to provide markedly improved heat shrinkage at lower temperatures than heretofore required for a variety of fabricated products. Polyethylene foam or polystyrene foam can be taken as the thermoplastic base material having a minor amount of a second polymeric material such as polyethylene terephthalate dispersed therein, the latter having a high absorbing capability for infrared energy. The present invention also includes the method of improving the heat-shrink capability of a heat-shrinkable thermoplastic polyolefin film and foam-making material.

32 Claims, No Drawings

THERMOPLASTIC RESIN FOAM SHEET HAVING IMPROVED HEAT SHRINK CAPABILITY AND THE METHOD FOR ITS PRODUCTION

BACKGROUND OF THE INVENTION

1. Field of the Invention

The present invention relates to a system for homogeneously mixing and forming plastic compositions into useful products, and more particularly to a system, including a method, for evenly dispersing a second polymeric material throughout the base plastic composition during plasticizing, mixing and extrusion into useful form.

Previously, it has been common practice to mix pigment particles into a plastic composition prior to extrusion by use of a screw conveyor, located within a plasticizer-extruder, which feeds the composition through a series of offset or staggered baffle plate mixing elements located at the distal end of the screw.

Plastic products manufactured by apparatus of the general type described have sufficient uniformity of coloration to satisfy many commercial requirements; however, the coloration may not be uniformly distributed throughout the plastic composition in its extruded state, particularly when output demand is high. Often pigment flow lines can be readily observed by visual inspection of the plastic products thereby produced. Also in the case of making plastic products such as sheet or film which is then oriented by stretching, the heat-shrinkage characteristics are limited to the thermal and physical limitations of the base material. Consequently, plastics produced by the above-described prior art procedure may fall below commercially accepted coloration and property standards for some types of products. Also, when other types of additives are introduced into the base material unless proper plasticizing, intermixing and extruding techniques are employed, the additives may not be uniformly dispersed to provide the desired properties attributable to the additives incorporated into the suitable plastic base material. Heretofore, there has been no effort to improve the heatshrink capability of foamed, oriented, polyolefin materials such as foamed polyethylene and foamed polystyrene by additives which enhance the infrared energy absorbing characteristics of the base material.

SUMMARY OF THE INVENTION

The present invention overcomes the aforementioned deficiencies by providing a method and composition which are adapted to ready fabrication of plastic sheet and preformed articles made therefrom having unique thermal contraction properties.

It is a primary object of the present invention to provide a system, including method and composition, for essentially uniformly dispersing a second polymeric addititive throughout a thermoplastic base composition so that the issuing plastic products when made will have the unique feature of markedly greater thermal contraction when subjected to infrared radiation exposure. The present invention may be used, for example, in producing foamed oriented plastic sheet which is readily formed into open-ended tubular blanks or sleeves having significantly improved heat shrinkage when subjected to infrared radiation, when the sleeves are mounted as protective labels on glass or plastic containers, or the like, for heat-shrinkage thereon in tightly conforming relation.

It is another important object of this invention to provide a method of improving the heat-shrinkage of thermoplastic polyolefins in foamed sheet form by the addition of minor amounts of different polymeric materials having improved infrared absorbing characteristics.

An additional object of the present invention is to provide a unique composition for labeling glass and plastic containers with a foamed, thermoplastic material having a second polymeric material incorporated therein which is highly receptive to infrared radiation, thus providing the composition with faster shrinkage when subjected to such radiation.

These and other objects and features of the present invention will become more fully apparent from the appended claims taken in conjunction with the ensuing detailed description.

DESCRIPTION OF THE PREFERRED EMBODIMENT

Presently, when producing polyethylene foam or polystyrene foam, various additives are frequently added to the formulation to enhance certain properties. This invention pertains to the inclusion of a material in the formulation to improve the capability of the foam to accept infrared energy. The additive must be uniformly dispersed throughout the base material and have a high absorbing capability for infrared energy, and be fully compatible with the base material.

It is known that polyethylene terephthalate absorbs infrared energy on its surface, and that polystyrene and, to a lesser degree, polyethylene are both partially transparent to infrared radiation. Therefore, it has been found that polyethylene terephthalate (PET) when dispersed throughout a polyethylene foam or a polystyrene foam improves the overall capability of the foam to accept the infrared energy, and thus be capable of heat-shrinkage faster and at a lower temperature. Also, polystyrene when dispersed throughout a polyethylene foam improves the acceptance of infrared energy.

Data on the infrared radiation absorption characteristics of a polyethylene film sheet with and without additives have been obtained. The plastic sheets tested were as follows:

A. 100% Polyethylene
B. 90% Polyethylene plus 10% polyethylene terephthalate (PET)
C. 90% Polyethylene plus 10% polystyrene The foregoing percentages are all by weight. The sheet thicknesses were from 0.024 to 0.038 inch. Radiation transmission spectra were obtained for the wave length range of 0.6 to 40 microns. The absorption characteristics were derived from the transmission spectra. Because of the manner in which the test sheets were made up (small sample sheets made by hand), they were slightly non-uniform. However, the test results appear reasonable and are believed to be of the proper magnitude.

The table below gives the fraction of incident radiant energy which is calculated to be absorbed by plastic sheets of the compositions tested. Calculations were made for two sheet thicknesses, 0.010 inch and 0.025 inch, and for two radiant energy source temperatures, 1000° F. and 2000° F.

| FRACTION OF INCIDENT ENERGY ABSORBED | | | | |
|---|---|---|---|---|
| Radiant Source Temperature | 1000° F. | | 2000° F. | |
| Plastic Sheet | .010 In. | .025 In. | .010 In. | .025 In. |
| Thickness | | | | |
| 100% Polyethylene | .30 | .50 | .29 | .48 |
| 90% Polyethylene + 10% PET | .34 | .58 | .32 | .54 |
| 90% Polyethylene + 10% Polystyrene | .37 | .61 | .35 | .58 |

The results indicate that the PET additive increases the energy absorption by about 12% while the polystyrene additive increases the energy absorption by about 22%.

The values given for the PET additive may be slightly high because the particular form of the PET additive may cause reflections which the tests see as absorption. Thus, there may be some slight uncertainty in the PET data; however, there is no such uncertainty with the polystyrene additive. Calculations based on the absorption properties of polyethylene alone and polystyrene alone, when combined in the 90-10 weight percentage combinations tested, give results very close to the experimental results.

Since the introduction of the selected additive into the polyethylene base material causes a greater fraction of the energy to be absorbed, the plastic sheet will heat faster with the additive, which leads to more efficient use of the heat source. Also, the amount of heating improvement depends on the amount and type of additive, as well as on the sheet thickness and energy source temperature.

Both low density polyethylene and mixtures of low density polyethylene and high density polyethylene have been been used as the base material for making the foamed plastic sheet. One example of such mixture is comprised of 33½ weight percent high density polyethylene and 66½ weight percent low density polyethylene plus small amounts of blowing agents. Foam labels which have been made for labeling glass containers have been comprised of the foregoing base composition. It is one which lends itself to the addition of an additive as set forth hereinabove for increased infrared absorption. The base material can thus preferably be low density polyethylene, or a mixture of low and high density polyethylene, which when modified with the PET or polystyrene in minor amount, exhibits more rapid contraction upon exposure to infrared radiation. Of course, the latter occurs when the composition is formed into a foamed sheet which is then oriented and formed into tubular heat-shrinkable sleeves or labels.

Where open-ended tubular sleeves are formed for use as protective and decorative labels for both glass and plastic bottles, and especially the latter, when the labels are exposed to infrared energy, the heat-up time to achieve satisfactory heat-shrinkage of the material is substantially reduced over the use of conventional direct convection heating. When the material is formed into uniaxially or biaxially-oriented foam sheet, the sheet is readily contractable upon exposure to infrared energy to be snugly fitted around the bottle exterior surfaces therebeneath. The reduced heating time allows the label shrinkage to take place faster, hence the machine speed for applying such labels is increased.

Various modifications may be resorted to within the spirit and scope of the appended claims.

I claim:

1. The method of improving the heat-shrink capability of a heat-shrinkable thermoplastic polyolefin film or foam sheet comprising the steps of adding to a heat-shrinkable thermoplastic polyolefin film-making base material a minor amount of a different second polymeric material having superior infrared radiation absorbing capability to said polyolefin base material, and forming a biaxially-oriented film or foam sheet of said mixed materials with improved heat-shrink capability, upon subject to heating including infrared radiation, namely the extent of time and the amount of heat required to heat-shrink said biaxially-oriented film or foam sheet while subjected to said heating being less than that required to heat-shrink a biaxially-oriented film or foam sheet of said polyolefin base material and which is free of said second polymeric material.

2. The method in accordance with claim 1, wherein said polyolefin base material comprises low-density polyethylene.

3. The method in accordance with claim 1, wherein said polyolefin base material comprises a mixture of low-density polyethylene and high-density polyethylene.

4. The method in accordance with claim 2, wherein said second polymeric material comprises polyethylene terephthalate in an amount of about 10% by weight.

5. The method in accordance with claim 2, wherein said second polymeric material comprises polystyrene in an amount of about 10% by weight.

6. The method in accordance with claim 1, wherein the addition of the second polymeric material increases the energy absorption on heating by at least about 10%.

7. The method in accordance with claim 4, wherein the addition of polyethylene terephthalate as the second polymeric material increases the energy absorption on heating by about 12%.

8. The method in accordance with claim 5, wherein the addition of polystyrene as the second polymeric material increases the energy absorption on heating by about 22%.

9. The method in accordance with claim 1, including the steps of forming an open-ended tubular sleeve of said biaxially-oriented film and placing same over a hollow container and then subjecting such sleeve to infra-red-type heating for improved thermal contraction in both circumferential and axial directions of said sleeve around said container.

10. The method in accordance with claim 1, wherein said polyolefin base material comprises about 90% by weight high density polyethylene and said second polymeric material comprises about 10% by weight polystyrene, said materials being mixed into a uniform physical mixture prior to film forming.

11. The method in accordance with claim 1, wherein said polyolefin base material comprises about 90% by weight high-density polyethylene and said second polymeric material comprises about 10% by weight polyethylene terephthalate, said materials being mixed into a uniform physical mixture prior to film forming.

12. The method of improving the heat-shrink capability of a heat-shrinkable thermoplastic polyolefin film comprising the steps of adding a minor amount of a second polymeric material having superior infrared radiation absorbing properties to a first polyolefin base material having lesser infrared radiation absorbing properties, forming a biaxially-oriented film of said mixed materials, and then forming an open-ended tubular sleeve having its greater heat-shrinkable in a circumferential direction than in an axial direction, the said sleeve having improved overall heat-shrinkage capability, upon subjection to heating including a substantial amount of infrared radiation, namely the extent of time and the amount of heat required to heat-shrink said biaxially-oriented film while subjected to said heating being less than that required to heat-shrink a biaxially-oriented film of said first polyolefin base material and which is free of said second polymeric material.

13. As an article of manufacture, a biaxially-oriented heat-shrinkable film or foam sheet having improved heat-shrink capability comprising a first thermoplastic polyolefin film-making base material in major amount and a different second thermoplastic polymeric material having superior infrared radiation absorbing properties in minor amount, said biaxially-oriented film or foam sheet having improved heat-shrink capability, upon subjection to heating including a substantial portion of infrared radiation, said improvement including a reduction in the extent of time and the amount of heat required to heat-shrink said biaxially-oriented film or foam sheet which is less than that required to heat-shrink a biaxially-oriented film or foam sheet of said first polyolefin base material and which is free of said second polymeric material.

14. The method in accordance with claim 12 wherein said polyolefin base material comprises low density polyethylene.

15. The method in accordance with claim 14 wherein said second polymeric material comprises polyethylene terephthalate in an amount of about 10% by weight.

16. The method in accordance with claim 14 wherein said second polymeric material comprises polystyrene in an amount of about 10% by weight.

17. The method in accordance with claim 12, including the steps of forming an open-ended tubular sleeve of said biaxially-oriented film and placing the same over a hollow container and then subjecting such sleeve to infrared-type heating for improved thermal contraction in both circumferential and axial directions of said sleeve around said container.

18. The method in accordance with claim 12, wherein said polyolefin base material comprises about 90% by weight high density polyethylene and said second polymeric material comprises about 10% by weight polystyrene, said materials being mixed into a uniform physical mixture prior to film forming.

19. The method in accordance with claim 12, wherein said polyolefin base material comprises about 90% by weight high-density polyethylene and said second polymeric material comprises about 10% by weight polyethylene terephthalate, said materials being mixed into a uniform physical mixture prior to film forming.

20. The article of manufacture in accordance with claim 13 wherein said polyolefin base material comprises low density polyethylene.

21. The article of manufacture in accordance with claim 20 wherein said second polymeric material comprises polyethylene terephthalate in an amount of about 10% by weight.

22. The article of manufacture in accordance with claim 20 wherein said second polymeric material comprises polystyrene in an amount of about 10% by weight.

23. The article of manufacture in accordance with claim 13 wherein said biaxially-oriented film or foam sheet is in the form of an open-ended tubular sleeve.

24. The article of manufacture in accordance with claim 13 wherein said polyolefin base material comprises about 90% by weight high-density polyethylene and said second polymeric material comprises about 10% by weight polystyrene.

25. The article of manufacture in accordance with claim 13 wherein said polyolefin base material comprises about 90% by weight high-density polyethylene and said second polymeric material comprises about 10% by weight polyethylene terephthalate.

26. An improved method for heat-shrinking a polyolefin film or foam sheet comprising the steps of preparing a homogeneous mixture of a thermoplastic polyolefin film-making base material and a minor amount of a different second polymeric material having an infrared radiation absorbing capability greater than that of said polyolefin base material, forming a biaxially-oriented film or foam sheet of said mixture and subjecting said biaxially-oriented film or foam sheet to heat including infrared radiation to heat-shrink said film or foam sheet, the extent of time and the amount of heat required to heat-shrink said biaxially-oriented film or foam sheet while subjected to said heating being less than that required to heat-shrink a biaxially-oriented film or foam sheet of said polyolefin base material and which is free of said second polymeric material.

27. The method in accordance with claim 26 wherein said polyolefin base material comprises low-density polyethylene.

28. The method in accordance with claim 27 wherein said second polymeric material comprises polyethylene terephthalate in an amount of about 10% by weight.

29. The method in accordance with claim 27 wherein said second polymeric material comprises polystyrene in an amount of about 10% by weight.

30. The method in accordance with claim 26, including the steps of forming an open-ended tubular sleeve of said biaxially-oriented film and placing the same over a hollow container and then subjecting such sleeve to infrared-type heating for improved thermal contraction in both circumferential and axial directions of said sleeve around said container.

31. The method in accordance with claim 26, wherein said polyolefin base material comprises about 90% by weight high-density polyethylene and said second polymeric material comprises about 10% by weight polystyrene, said materials being mixed into a uniform physical mixture prior to film forming.

32. The method in accordance with claim 26, wherein said polyolefin base material comprises about 90% by weight high-density polyethylene and said second polymeric material comprises about 10% by weight polyethylene terephthalate, said materials being mixed into a uniform physical mixture prior to film forming.

* * * * *

UNITED STATES PATENT AND TRADEMARK OFFICE
CERTIFICATE OF CORRECTION

PATENT NO. : 4,339,551
DATED : July 13, 1982
INVENTOR(S) : James E. Heider

It is certified that error appears in the above-identified patent and that said Letters Patent are hereby corrected as shown below:

Col. 4, line 67 (Claim 12) "shrinkable" should be --shrinkage--

Signed and Sealed this

Second Day of August 1983

[SEAL]

Attest:

GERALD J. MOSSINGHOFF

Attesting Officer

Commissioner of Patents and Trademarks